US007908952B2

(12) United States Patent
Wilson et al.

(10) Patent No.: US 7,908,952 B2
(45) Date of Patent: Mar. 22, 2011

(54) ANTI-KICKBACK DEVICE

(75) Inventors: Michael Wilson, Brockville (CA); Joanne Rogers, Bishop Auckland (GB)

(73) Assignee: Black & Decker Inc., Newark, DE (US)

( * ) Notice: Subject to any disclaimer, the term of this patent is extended or adjusted under 35 U.S.C. 154(b) by 265 days.

(21) Appl. No.: 12/168,963

(22) Filed: Jul. 8, 2008

(65) Prior Publication Data

US 2009/0044677 A1 Feb. 19, 2009

(30) Foreign Application Priority Data

Jul. 26, 2007 (EP) .................................... 07113275

(51) Int. Cl.
*B27B 9/04* (2006.01)
*B23Q 9/00* (2006.01)

(52) U.S. Cl. .......................... 83/574; 83/DIG. 1; 30/390

(58) Field of Classification Search ............ 83/485–489, 83/745, 574, DIG. 1; 30/388, 390; 384/10, 384/21, 37, 38; 192/129 R
See application file for complete search history.

(56) References Cited

U.S. PATENT DOCUMENTS

| | | | | |
|---|---|---|---|---|
| 2,438,023 | A * | 3/1948 | Emil | 83/223 |
| 3,298,407 | A * | 1/1967 | Scott | 83/489 |
| 3,600,047 | A * | 8/1971 | MacDonnell | 384/39 |
| 4,677,750 | A * | 7/1987 | Maier et al. | 30/376 |
| 5,136,910 | A * | 8/1992 | Kuhn et al. | 83/486 |
| 5,678,314 | A * | 10/1997 | Braunbach et al. | 83/489 |
| 6,917,755 | B2 * | 7/2005 | Nguyen et al. | 392/418 |
| 2003/0214088 | A1 * | 11/2003 | Chang | 269/139 |
| 2006/0283024 | A1 | 12/2006 | Wilson et al. | |

FOREIGN PATENT DOCUMENTS

| | | | |
|---|---|---|---|
| DE | 1600235 | A1 | 2/1970 |
| DE | 19635527 | A1 | 2/1998 |
| DE | 29812871 | U1 | 10/1998 |
| DE | 10251578 | B3 | 3/2004 |
| DE | 102004002275 | * | 8/2005 |
| EP | 0162648 | * | 11/1985 |
| EP | 1418018 | A1 | 5/2004 |

* cited by examiner

*Primary Examiner* — Stephen Choi
(74) *Attorney, Agent, or Firm* — Michael Aronoff; Adan Ayala

(57) ABSTRACT

The present invention provides an anti-kickback for arresting movement of a rail accommodated within an elongate channel. The anti-kickback device includes a slide member arranged to slide along a slide surface between an extended position and a retracted position. The device further includes a resilient member which biases the slide member along the slide surface. The slide member, when in the extended position, is designed to urge the rail into abutment with a wall of the channel to arrest movement of the rail accommodated within the channel. The device further includes a manually operable button coupled to the slide member to enable user-operated movement of the slide member towards the retracted position and a lock mechanism for holding the slide member in the retracted position.

6 Claims, 7 Drawing Sheets

ANTI-KICKBACK DEVICE

CROSS-REFERENCE TO RELATED APPLICATIONS

This application claims priority under 35 U.S.C. §119 to European Patent Application No. 07 113 275.7 filed Jul. 26, 2007. The entire contents of that application are expressly incorporated therein by reference thereto.

FIELD OF THE INVENTION

The present invention relates to an anti-kickback device for arresting movement of a rail accommodated within a channel in one direction and for allowing free movement between rail and channel in another opposite direction. This type of device is suitable for use on a manually operated circular saw which has a plunge-cut action and which is guided by the rail and channel arrangement.

BACKGROUND AND SUMMARY OF THE INVENTION

Circular saws with a plunge-cut action are typically known as plunge saws. Such saws comprise a motor and gearbox disposed in a housing which includes a handle and manually operated switch for activating the motor. The housing is pivotally attached to a base plate which includes a blade guard for accommodating a saw blade which is attached to the gearbox output spindle. Springs are arranged to urge the housing into a position where the saw blade is wholly accommodated within the blade guard. During use, a user places the base plate on a workpiece, depresses the switch to activate the motor thereby initiating rotation of the saw blade and then plunges the housing towards the workpiece and base plate such that the rotating saw blade passes through an aperture in the base plate and into the workpiece. From this position, the saw can be moved in a forward direction along a cut-line thereby cutting a slot in the workpiece. DE19635527 describes such a saw.

Kickback can occur as the saw is plunged into the workpiece. The kickback phenomenon is not wholly understood, but it often occurs in the early stages of plunging the blade into the workpiece. As the saw blade first engages with the workpiece, kick-back can cause the saw to jump out of the workpiece and back towards the operator with sufficient force to hit the operator. Kick-back might also occur if the saw is twisted out of alignment with the cut during cutting so that the blade catches the edge of the slot cut by the blade. As kick-back occurs, it is thought that the blade "grabs" the workpiece in the slot being cut. In the worse case scenario, the blade can stop rotating with respect to the workpiece and, as the motor continues to drive the blade, the saw is thrown off the workpiece and towards the user at high speed. The user is typically unable to react when kick-back occurs and has insufficient time to disengage power to the motor.

Thus, kickback is potentially dangerous and could cause severe injury. Furthermore, if a guide is being used to direct the cutting action of the saw as kickback occurs, the saw can jump out of the workpiece and across the guide while the blade is exposed from the blade guard and still rotating thereby damaging the guide and/or saw blade.

Guides are known and can be used to direct various power tools, such as circular saws, plunge saws, routers or jigsaws. The guide can be placed on a workpiece and the tool is then placed on the guide. Clamping devices are often used to secure the guide to the workpiece. Typically, a guide comprises a length of extruded aluminium having a rail which extends along the length of the guide parallel to an edge of the guide along which the power tool operates. In the case of a circular saw, the rail engages with a channel formed in the base plate of the saw. The saw can be placed on the guide such that the rail engages the channel. The operator can run the saw along the guide, directed by the rail, while the saw blade cuts the workpiece. A strip of material having a relatively high coefficient of fiction is disposed on the underside of the guide which engages the workpiece to maintain the guide in position during operation of the power tool. This is particularly useful if clamping devices are not available.

EP1410818A describes a guide comprising a stop part with an overlapping portion. A plunge saw base plate has a protruding tang which fits between the guide's rail and an overlapping portion of the stop part. The stop part can be disposed in a channel running along the length of the guide fixed in position with a thumbscrew arrangement. Before plunging the saw into a workpiece, the user places the guide on the workpiece and arranges the stop part in the desired position. The base plate of the saw is then positioned on the guide such that the tang abuts the stop part. Thus, if kickback occurs, the base plate is held on the guide and prevented from jumping backwards towards the operator by the stop part. The stop part and tang combine to form a manually adjusted anti-kickback device.

An anti-kickback device is disclosed by EP1728604A for arresting movement of a rail accommodated within a channel. The device comprises a slide surface located in one of the rail or channel and inclined in relation to an opposing side wall of the other of the rail or channel. The device comprises a slide member arranged to slide along the slide surface between an extended position and a retracted position, the retracted position is further from the side wall than the extended position. The device also comprises a manually operable button coupled to the slide member to enable user-operated movement of the slide member towards the retracted position. The device further comprises a resilient member which biases the slide member along the slide surface towards the extended position and into abutment with the side wall. Movement of the channel in relation to the rail in a longitudinal forward direction causes friction between the slide member and the side wall to push the slide member along the slide surface and towards the retracted position. Movement of the channel in relation to the rail in a longitudinal backward direction opposite to the forward direction causes friction between the slide member and the side wall to push the slide member along the slide surface towards the extended position thereby taking up clearance between the rail and the channel to the extent that the rail is wedged stationary against the channel.

As mentioned above, the purpose of such a device is to prevent unexpected and sudden movement of the saw towards the user. Thus, should kick-back occur, the saw is prevented from moving back in a longitudinal backward direction along the rail and towards the operator. Such a device can be integral with a component comprising the rail, like, for example a guide. Alternatively, such a device can be integral with a component comprising the channel, like, for example the base plate of a saw, or the underside of a saw.

The user need only engage the rail and the channel for the anti-kickback device to be activated. Thus, no positive manual adjustment or activation is normally required. However, users have expressed a desire to suspend temporarily activation of the device to allow free movement of the channel in relation to the rail in both longitudinal directions. For example, when the user wishes to slide a plunge saw (comprising the device) back to its start position without the bother of lifting it from the guide. The slide member can be forced, by the button, against the bias of the resilient member into the retracted position where there may be no contact between the slide member and the side wall. Unfortunately, one of the user's hands must maintain operation of the button otherwise the device will be reactivated to prevent the plunge saw from sliding back to its start position. This can be awkward, especially when repeated several times.

The present invention provides an anti-kickback device of the type disclosed in EP1728604A, further comprising a lock mechanism for holding the slide member in the retracted position. The lock mechanism can maintain operation of the button so that activation of the device is suspended and free movement of the channel in relation to the rail in both longitudinal directions is permitted. This has the benefit of freeing both the user's hands.

Preferably, the lock mechanism comprises a hook on the button for engagement with a dowel on one of the rail or channel. This is a simple and inexpensive lock mechanism. It can rely on the bias of the resilient member to maintain the hook engaged with the dowel if the dowel is arranged on the opposite side of the button to the direction of bias of the resilient member.

Preferably the button is coupled to the slide member by a pin passing through a linear slot in the one of the rail or channel, wherein the slot is parallel to the slide surface. Thus, the slot and pin arrangement do not interfere with the slide member's contact with the slide surface.

Preferably, the resilient member is at least partially received within a hollow elongate sleeve. A resilient member, by its very nature, becomes less stable the more it is compressed. A good example would be a helical spring which is liable to bow laterally outwardly when compressed along its longitudinal axis. The same could apply to a cylindrical rubber bush. The risk of bowing outwardly is reduced, or eliminated, by the hollow elongate sleeve which braces the resilient member in its lateral direction while allowing the resilient member freedom to be compressed, or relaxed, along its longitudinal axis. This helps to prevent the resilient member from detaching itself from the device. It also helps to house the resilient member where it is safe from interference or damage.

Preferably, the sleeve is a hollow cylinder and the resilient member is a helical spring. A helical spring is a freely available item which can be manufactured small enough to be housed in a compact space. The hollow cylinder braces the helical spring when it is compressed inside the sleeve which helps prevent the spring from bowing laterally outwardly.

Preferably, the sleeve is guided along a straight path by a guidance mechanism. The guidance mechanism is part of the device and prevents the sleeve from moving laterally outwardly from the device. This further enhances the ability of the sleeve to prevent the spring from bowing laterally outwardly. That is because the sleeve can only travel along the straight path and so the helical spring, which is braced by the sleeve, cannot stray from the straight path and leave the device.

The guidance mechanism may be any system capable of guiding the sleeve along a straight path. Preferably, the guidance mechanism comprises a ridge on the sleeve which is slideable within with an elongate groove in the one of the rail or channel. Alternatively, the guidance mechanism comprises a ridge in the one of the rail or channel which is slideable within with an elongate groove on the sleeve. Either of these two variants is a simple and inexpensive guidance mechanism.

Preferably, there is a ridge on opposite sides of the sleeve, wherein each ridge has a corresponding groove. Having ridges on opposing sides of the sleeve improves stability as the sleeve moves along the straight path because it is guided on two diametrically opposing sides and is less likely to become stuck.

Preferably, the slide member is a cylindrical roller with a central axis arranged parallel to the slide surface. The lines of contact between the cylindrical roller and the slide surface, on the one hand, and between the cylindrical roller and the rail or the channel, on the other hand, make the roller less prone to jamming than a face-to-face contact, as would be the case of the slide member were, for example, cube-shaped.

The present invention also provides a hand-operated tool guidable by a rail, the tool comprising a main housing, a base plate coupled to the main housing, and an elongate channel in one side of the base plate, wherein the channel is arranged to accommodate a rail and the base plate comprises the anti-kickback device.

The present invention further provides a guide for guiding a hand-operated tool, the guide comprising: a support surface, and a rail protruding from one side of the support surface, wherein rail is arranged to be accommodated within an elongate channel in one side of a tool and the guide comprises the anti-kickback device.

BRIEF DESCRIPTION OF THE DRAWINGS

An embodiment of the present invention is now described by way of example, with reference to the following drawings, in which.

DETAILED DESCRIPTION OF THE INVENTION

Figure 1:
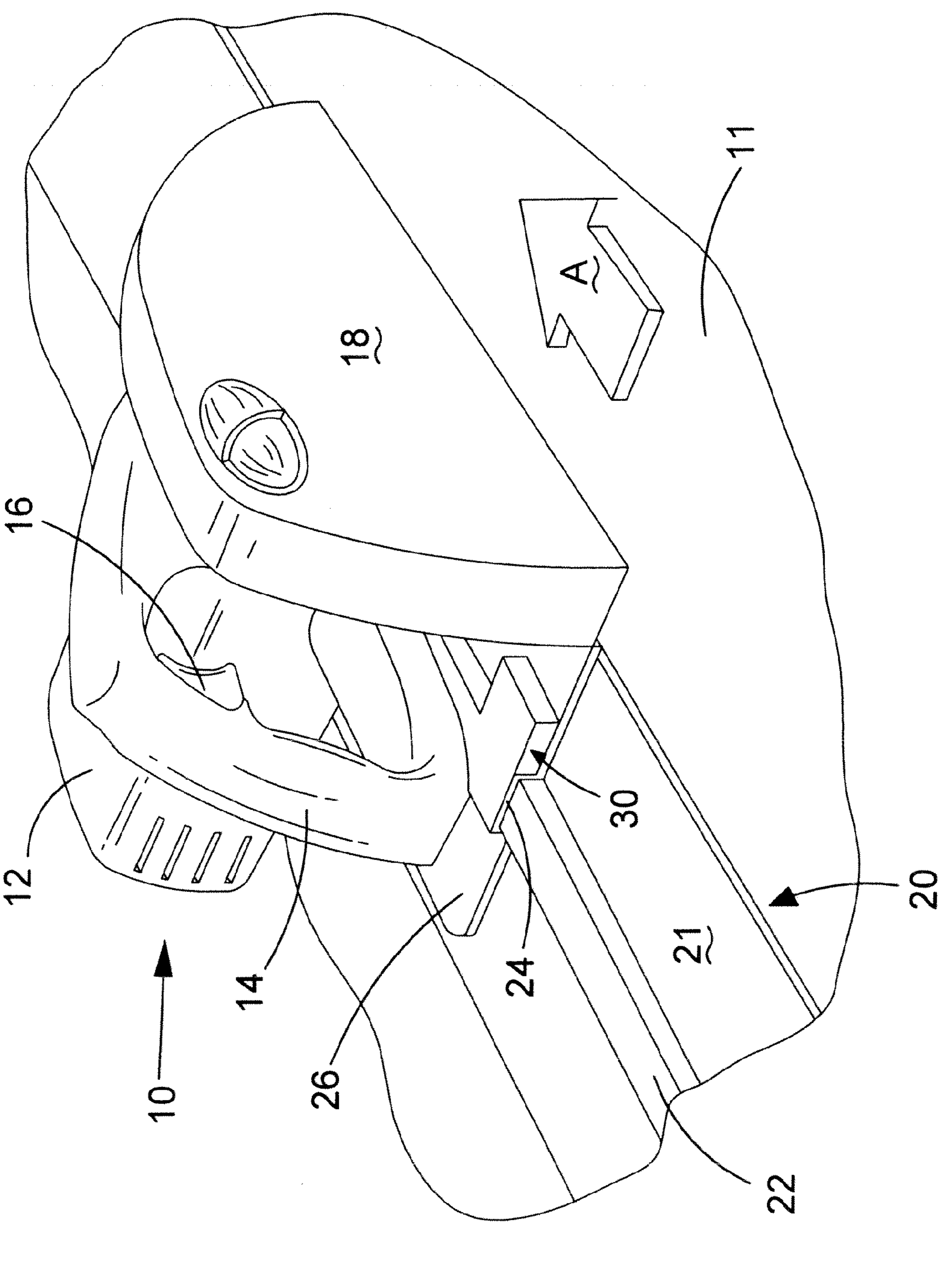
FIG. 1 shows a schematic diagram of a circular saw embodying the present invention and being disposed on a guide.

Referring to FIG. 1, a circular saw 10 embodying the present invention is shown in schematic form and in the plunged orientation whereby the saw blade (not shown) engages with a workpiece 11. The saw 10 comprises a motor housing 12 which includes a handle or gripping portion 14 having a switch 16 for operating the motor. A blade guard 18 is arranged to house the saw blade. The saw is disposable on to a guide 20 which comprises a support surface 21 and a longitudinal rail 22 protruding from the upper side of the support surface. The rail engages with a channel 24 arranged on the lower side of a base plate 26 of the saw 10. Thus, the saw is able to slide along the guide, being guided by cooperation between the rail and channel on the guide and the base plate, respectively.

An anti-kickback device 30 is disposed on the saw's base plate 26. The device can allow relatively free movement of the saw in the direction of cut, as indicated by arrow A. The device can also arrest movement of the saw in a direction opposite to arrow A i.e. opposite to the direction of cut. Thus, as the saw is plunged into the workpiece, the saw can be prevented from moving in a backwards direction towards the user (opposite to arrow A) by a force exerted onto the saw as the blade engages the workpiece during plunging, for instance. Such a force exerted in this backward direction causes the device to grip the saw to the guide with sufficient friction that the saw is prevented from moving towards the user along the rail. Further, the saw can be prevented from jumping off the guide by the device's gripping action onto the guide. In this manner, the saw is held on the guide when/if kickback occurs. Furthermore, the saw is held to the workpiece if the guide is clamped to the workpiece, by connection of the saw to the guide, and the guide to the workpiece.

Figure 2:
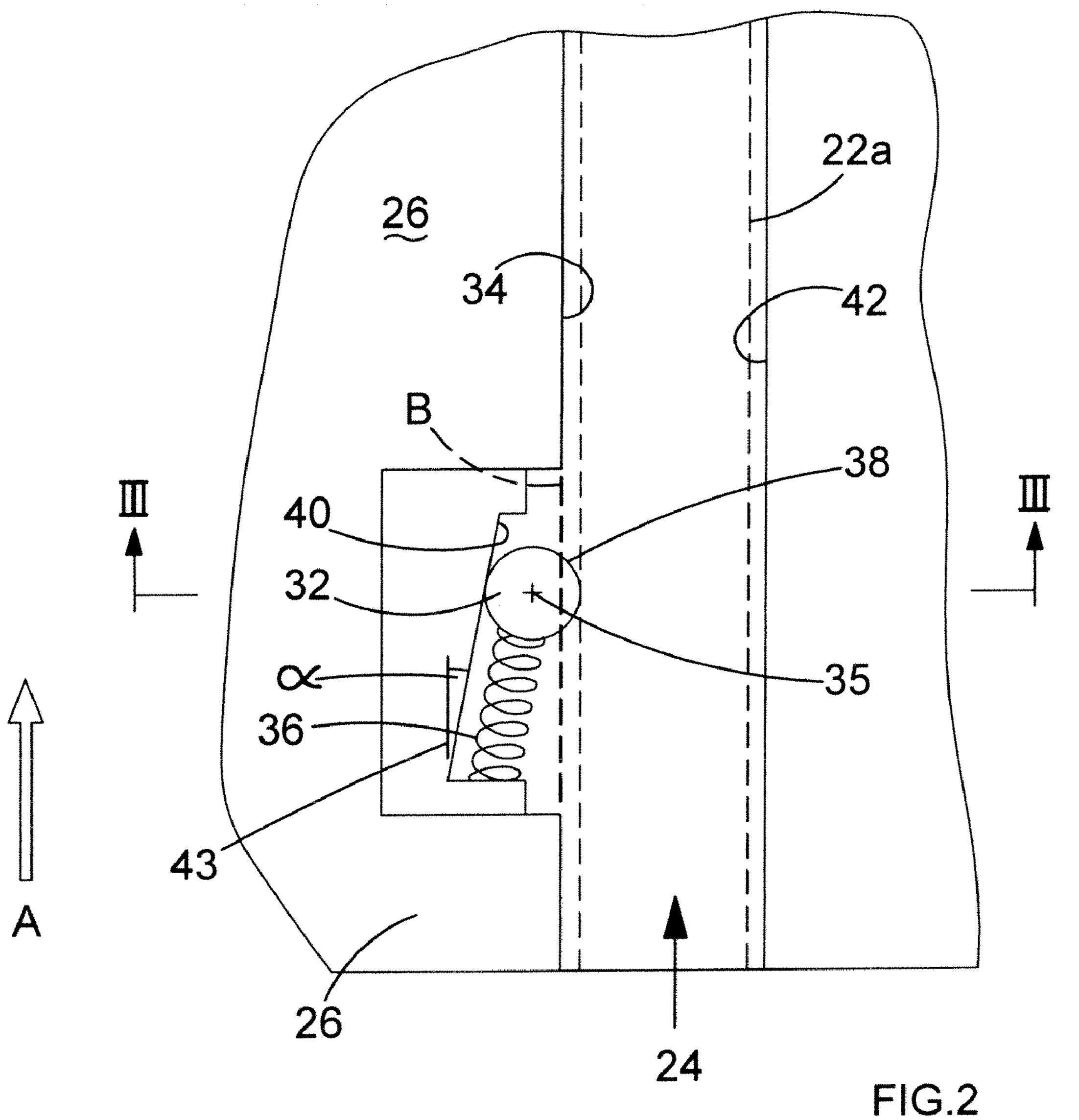
FIG. 2 shows schematically an anti-kickback device for the circular saw.

Referring to FIG. 2, an embodiment of the anti-kickback device 30 is shown schematically viewed from above the guide. The device comprises a slide member in the form of a cylindrical roller 32 a portion of which, in an "extended" position, extends into the channel 24 of the base plate 26 by a relatively small distance beyond a dashed line B. The dashed line B is aligned with an adjacent side wall 34 of the channel 24. When the roller is completely behind the dashed line B it is considered to be in a "retracted" position.

The roller is cylindrical and has a central axis 35. The roller is urged towards the extended position by a helical spring 36. One side of the roller's cylindrical surface 38 engages an opposing side face wall of the rail 22 when the saw is on the guide. The distance by which the roller's surface 38 can extend into the channel is sufficient for the cylindrical surface to contact the rail.

The position occupied by the rail 22 when the saw is disposed on the guide is shown as dashed lines 22*a*. The dashed lines 22*a* represent the side walls of the rail disposed in the channel 24. The roller 34 can move with respect to the base plate 26 in a direction closer to, or further from, the rail because the roller's cylindrical surface 38 slides along a slide surface 40 which is slightly inclined with respect to the side walls of both the rail and the channel 24. Thus, the distance between the rail and the cylindrical surface 38 varies depending on the position of the roller.

The spring 36 urges the roller 34 towards its extended position so that the roller engages the opposing side wall of the rail even when there is no relative movement between the guide and base plate. The slightest movement of the base plate relative to the guide in an opposite direction to arrow A causes the roller to slide along the slide surface 40 in the general direction of arrow A with respect to the base plate. This forces the roller to move further towards its extended position thereby wedging the rail between the roller 34 and the channel's opposing side wall 42. This activates the device so that the saw's base plate is locked to the guide.

Conversely, movement of the base plate relative to the guide in the direction of arrow A is permitted because the roller produces minimal sliding friction between itself and the opposing side wall of the rail. The result is equilibrium between the bias of the spring in one direction and the frictional force in the opposite direction which maintains the roller between its extended and retracted positions. The device is not activated and the saw's base plate is not locked to the guide. The spring constant of spring 36 should be chosen so that the force exerted on the roller by the spring is relatively low.

The optimum angle of inclination a between the slide surface 40 and a plane 43 parallel to the adjacent side wall 34 of the channel is between 4 and 10 degrees and preferably 6.5 degrees. However, the angle of inclination $\alpha$ can be as much as between 2 and 15 degrees.

Figure 3:
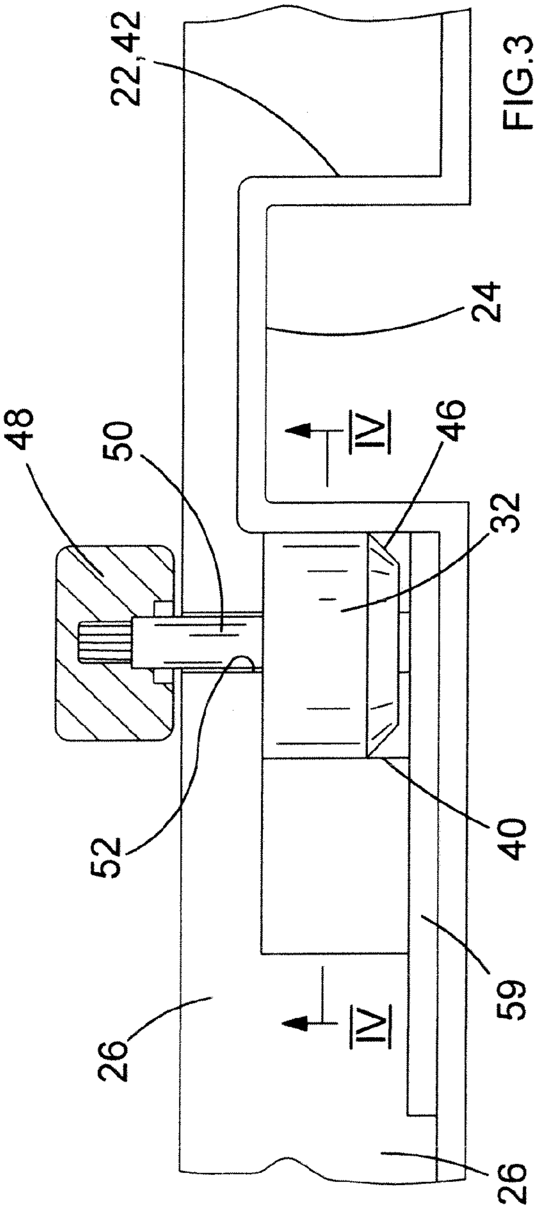
FIG. 3 shows schematically the device, and shown in cross-section along line III-III of FIG. 2.

Referring to FIG. 3, the roller 34 has a truncated conical-shaped bevelled edge 46 facing towards the underside of the base plate which bevelled edge allows the saw to be placed directly on top of the rail, rather than sliding the saw onto the guide from one end of the rail. In other words, as the saw is placed on the support surface, the bevelled edge allows the rail to move between the roller and the channel's opposing side wall 42, gently easing the roller out of the rail's path as the rail and channel engage one another. This action can be further assisted if the rail has a rounded edge, in cross-section (not shown).

In addition, the anti-kickback device can be provided with a manually operable button 48. The button is coupled to the roller 34 by a pin 50. The roller can rotate with respect button. The button provides a means for the user to free or unlock the anti-kickback device if ever it becomes wedged stuck during operation. The pin is guided by a slot 52 passing through the base plate 26. The slot is linear in its longitudinal direction and has a width slightly greater than the diameter of the pin to allow relatively free movement of the pin therein. The slot has parallel sides which are parallel to the slide surface 40.

Figure 4:
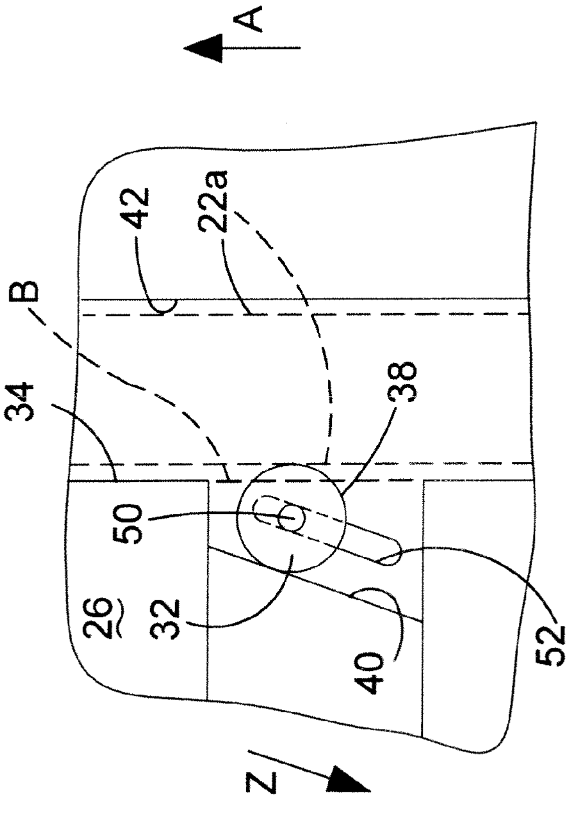
FIG. 4 shows schematically the device, and shown in cross-section along line IV-IV of FIG. 3.

Referring to FIG. 4, the user can move the roller out of contact with the rail by pulling the button in a direction Z which is parallel to the slide surface and which moves the roller 32 along or substantially along the slide surface 40 of the retracted position. When the roller is held away from the rail 22 in its retracted position the anti-kickback device is deactivated and the button is in its "operative" position. As such, operation of the device is suspended and the circular saw can be moved along the guide in a direction opposite to arrow A (see FIG. 1, 2 or 4, for instance) without the device locking the saw's base plate to the guide. This has the benefit of allowing the user to slide the saw back to a starting position on the guide after a cut has been completed without having to lift it from the guide.

Figure 5:
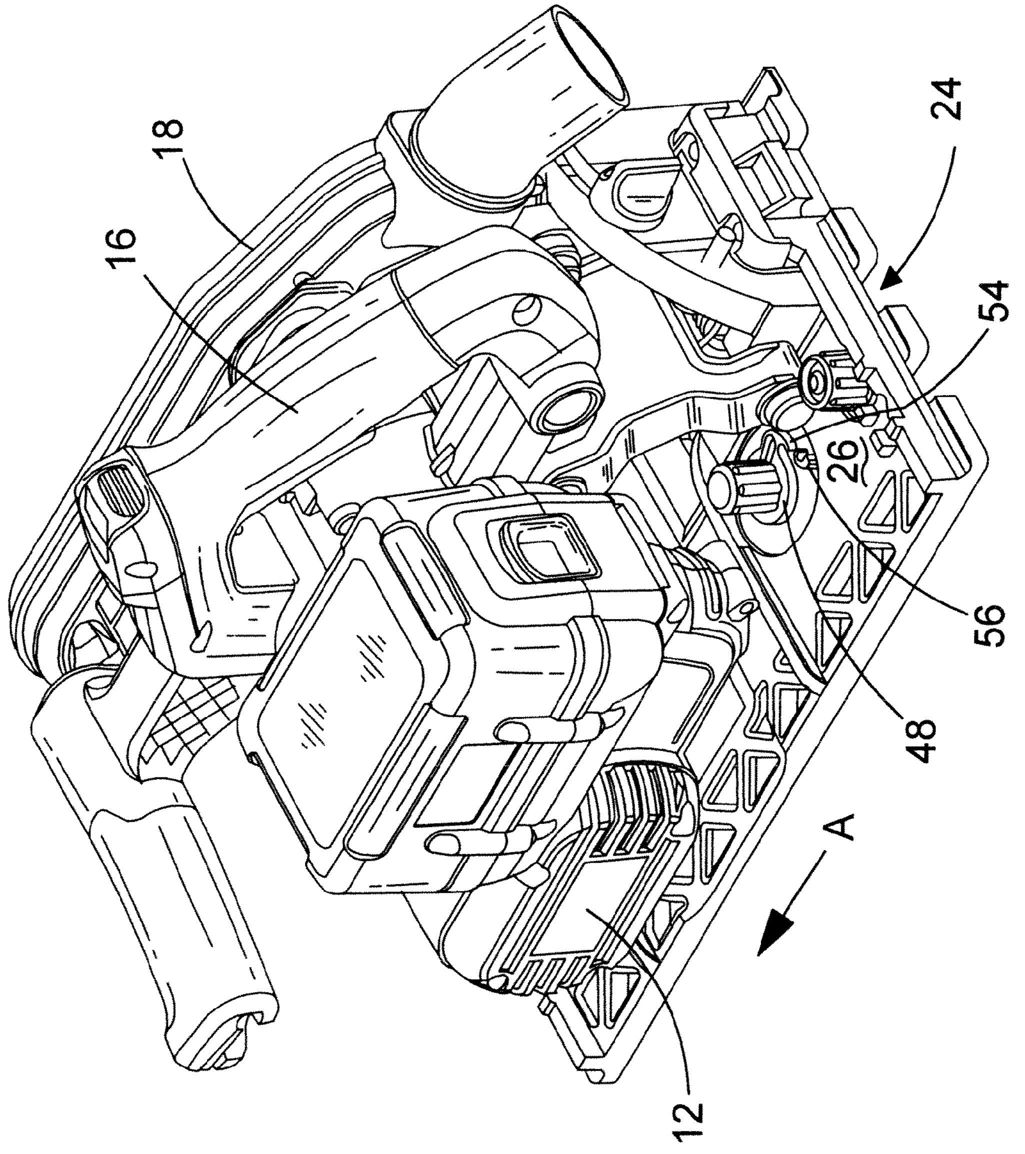
FIG. 5 is a perspective view of the upper side of a base plate of the circular saw.
Figure 6:
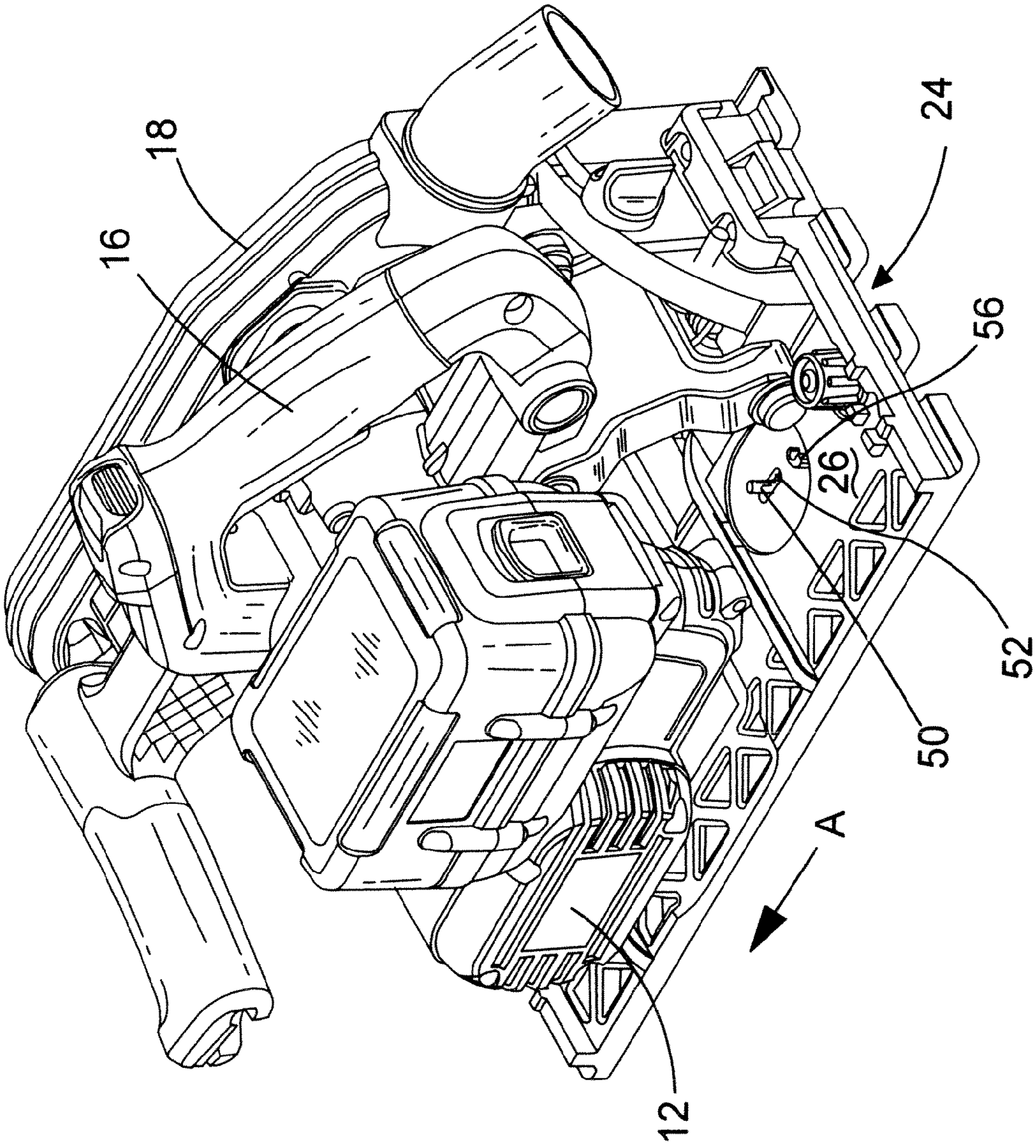
FIG. 6 is the same view as FIG. 5 without a knob connected to the device.

The button is moveable to its operative position against the bias of the spring because the button is coupled to the roller. Referring to FIGS. 5 and 6, the button has a hook 54 on its edge and the base plate 26 has a finger 56 on its upper side. Engagement between the hook and the finger secures the button in its operative position against the bias of the spring. The hook is maintained in engagement with the dowel because the dowel is arranged on the opposite side of the button to the direction of bias of the spring. Disengagement of the hook from the finger causes the button, and hence the roller, to move, under the bias of the spring, away from the button's operative position to where the roller's cylindrical surface is contactable with the rail i.e. the extended position of the roller. The hook and finger arrangement is a lock mechanism for holding the roller in the retracted position.

Figure 7:
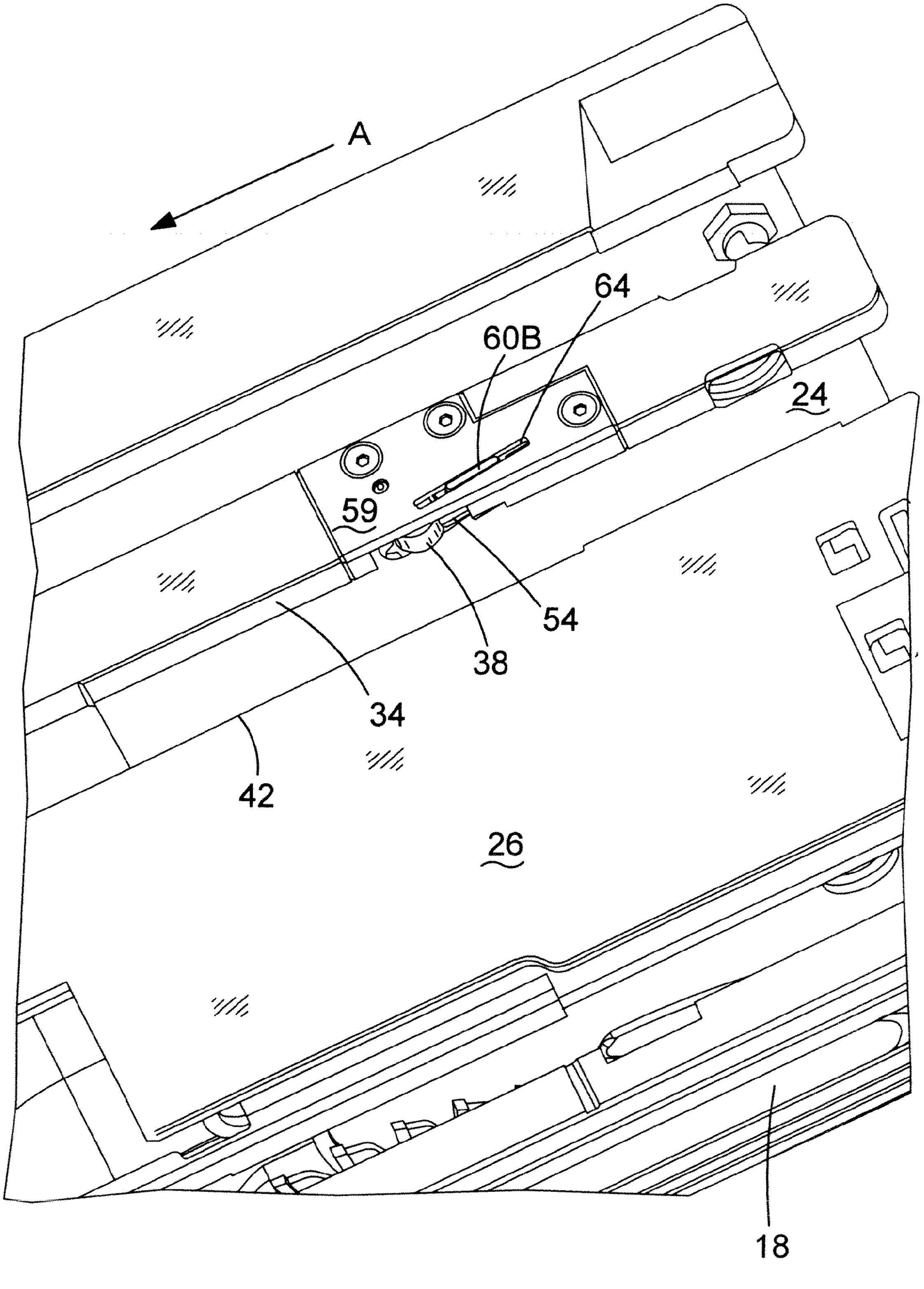
FIG. 7 is a perspective view of the lower side of the base plate.
Figure 8:
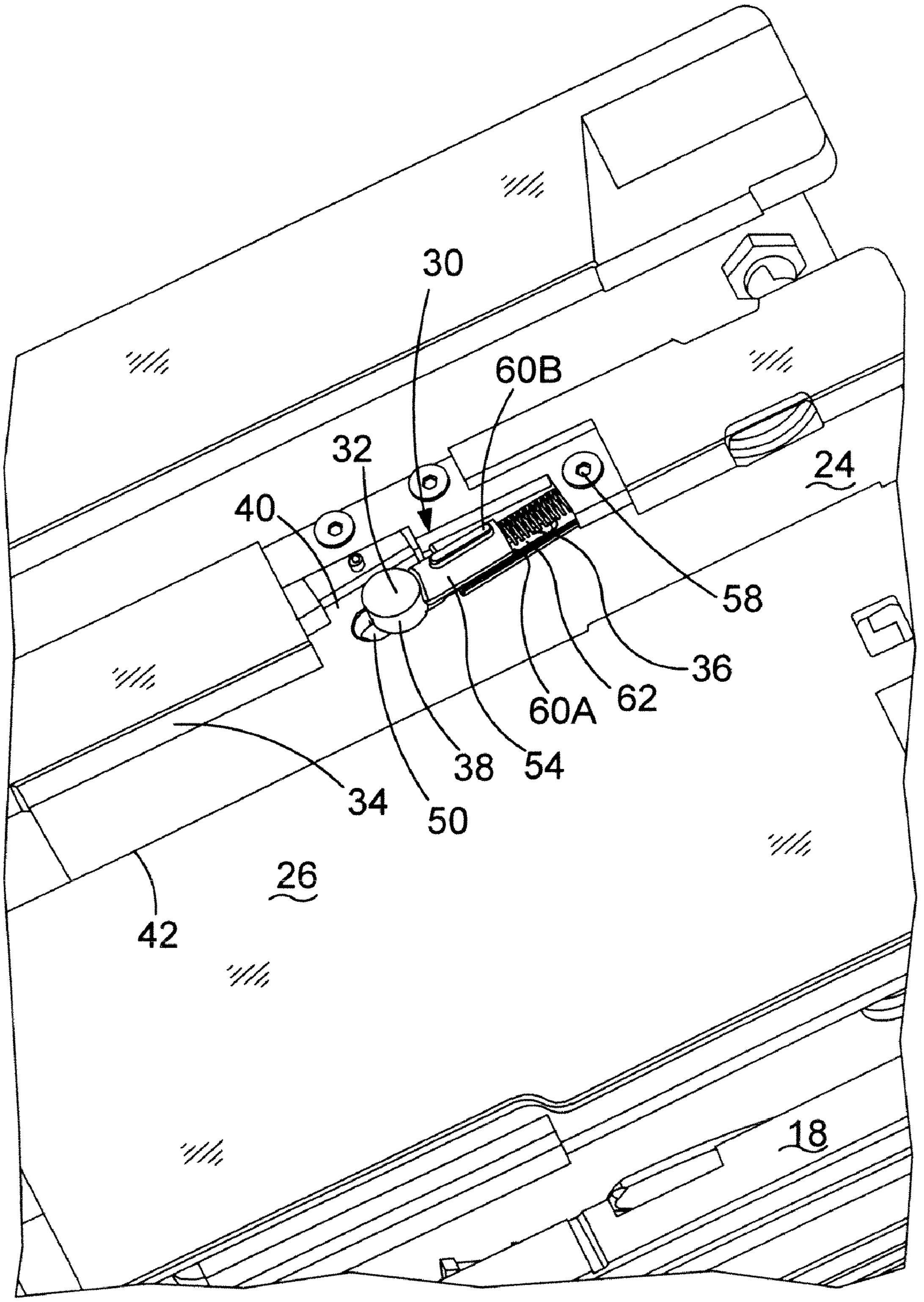
FIG. 8 is the same view as FIG. 7 without a cover for the device.

Referring now to FIGS. 7 and 8, an elongate sleeve 54 for coupling the spring 36 to the roller 32 is shown. The sleeve has a hollow generally cylindrical-shape which is adapted to receive a portion of the spring. The other end of the spring is secured to a screw 58 in the base plate 26. The sleeve is adapted at one end to abut against the cylindrical surface 36 of the roller 34. The sleeve, roller, spring and slide surface are housed within the base plate 26 by a cover 59 flush with the underside of the base plate 26. The sleeve comprises a pair of ridges 60*a*, 60*b* running longitudinally along diametrically opposed external sides of the sleeve. One ridge 60*a* engages an elongate groove 62 in the base plate while the other ridge 60*b* engages an elongate groove 64 in the cover. The grooves in the base plate and the cover are longer than the ridges. This allows the sleeve to side back and forth within the device. The ridges 60*a*, 60*b* and the grooves 62, 64 are parallel to the slide surface 40. Thus, the coupling member is moveable in a straight line parallel to the inclined surface 40. Containment of the spring within the sleeve ensures that the spring is braced and remains substantially straight and cannot bow laterally outwards, as it is prone to do when most compressed i.e. when the button has been moved to its operative position. If the spring bows laterally outwards it may escape the device which, as a result, will be inoperable. Note that the coupling member is not too long that it inhibits movement of the roller between its extended and retracted positions.

The roller can be made from any suitable material, such as metal (steel or aluminium for instance), synthetic plastic (high impact nylon for instance), or resilient material (such as rubber). Factors, such as cost of manufacture, wear rates and coefficient of friction, may influence the choice of material.

The invention claimed is:

1. A device for arresting movement of a rail accommodated within a channel, wherein the device comprises:

a slide surface located in one of the rail or channel and inclined in relation to an opposing side wall of the other of the rail or channel;

a slide member arranged to slide along the slide surface between an extended position and a retracted position;

a resilient member which biases the slide member along the slide surface towards the extended position and into abutment with the side wall; and a manually operable button coupled to the slide member to enable user-operated movement of the slide member towards the retracted position, wherein movement of the channel in relation to the rail in a first direction causes friction between the slide member and the side wall to push the slide member along the slide surface and towards the retracted position, wherein movement of the channel in relation to the rail in a second direction, opposite to the first direction, causes friction between the slide member and the side wall to push the slide member along the slide surface towards the extended position, and wherein the device further comprises a lock mechanism for holding the slide member in the retracted position.

2. The device of claim 1, wherein the lock mechanism comprises a hook on the button for engagement with a dowel on the one of the rail or channel.

3. The device of claim 1, wherein the button is coupled to the slide member by a pin passing through a linear slot in one of the rail or channel, and wherein the slot is parallel to the slide surface.

4. The device of claim 1, wherein the slide member is a cylindrical roller with a central axis arranged parallel to the slide surface.

5. The device of claim 1, wherein the slide member urges the rail into abutment with a wall of the channel when in the extended position thereby arresting movement of the rail accommodated within the channel.

6. A power tool guidable by a rail, the tool comprising;

a main housing;

a base plate coupled to the main housing; and a channel in one side of the base plate, wherein the channel is arranged to accommodate a rail and the base plate comprises a device for arresting movement of a rail accommodated within a channel, wherein the device comprises:

a slide surface located in one of the rail or channel and inclined in relation to an opposing side wall of the other of the rail or channel;

a slide member arranged to slide along the slide surface between an extended position and a retracted position;

a resilient member which biases the slide member along the slide surface towards the extended position and into abutment with the side wall; and a manually operable button coupled to the slide member to enable user-operated movement of the slide member towards the retracted position, wherein movement of the channel in relation to the rail in a first direction causes friction between the slide member and the side wall to push the slide member along the slide surface and towards the retracted position, wherein movement of the channel in relation to the rail in a second direction, opposite to the first direction, causes friction between the slide member and the side wall to push the slide member along the slide surface towards the extended position, and wherein the device further comprises a lock mechanism for holding the slide member in the retracted position.

* * * * *